Sept. 1, 1964
J. E. HALTON
3,147,217
FLOTATION METHOD FOR THE TREATMENT AND CLARIFICATION OF WATER
Filed May 19, 1958
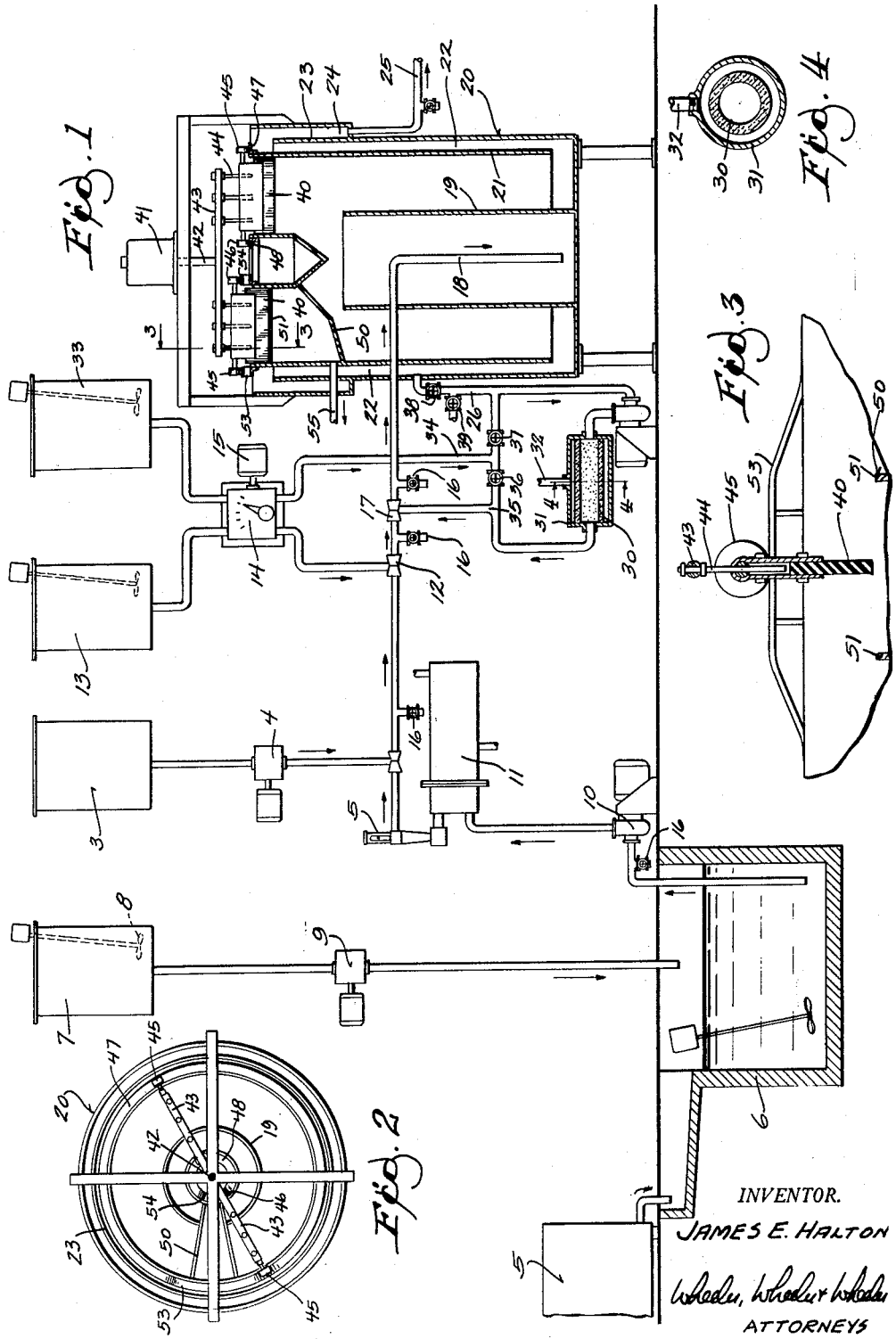
INVENTOR.
JAMES E. HALTON
Wheeler, Wheeler & Wheeler
ATTORNEYS

United States Patent Office 3,147,217
Patented Sept. 1, 1964

3,147,217
FLOTATION METHOD FOR THE TREATMENT AND CLARIFICATION OF WATER
James Edward Halton, Oxnard, Calif., assignor to William M. Bready and John W. Bready, Milwaukee, Wis.
Filed May 19, 1958, Ser. No. 736,080
5 Claims. (Cl. 210—44)

This invention relates to a flotation method for the treatment and clarification of water containing laundry waste or other impurities. The description will use the treatment of laundry waste water as an exemplification, all particulars being by way of example.

In order to reduce the fresh water reqirements of laundries, it is desirable to reclaim and reuse laundry waste water. The invention contemplates that the waste water will be accumulated in a ballast tank. In the ballast tank, bentonite is added at the approximate rate of 2.5 grains per gallon of water. The bentonite particle adsorbs grease, fats and waxes and absorbs oils.

Thereafter the water is pumped from the ballast tank through a heater which raises its temperature to approximately 140° F. It is then acidified by the addition of aluminum sulphate or potassium aluminum sulphate (alum) or other flocculating agent with or without acid such as sulfuric acid, at the rate of approximately 50 grains per gallon, and passed into a clarifier mixed with a quantity of alkalized and aerated water. In practice, I use sulfuric acid to reduce the soiled water to a pH of 6.5 to 7.0, and alum to reduce the water to a pH of 4.4 to 5.5.

In the course of recirculation, the previously clarified water is passed through a porous ceramic cylinder or a porous Alundum tube or a porous Carborundum cylinder of sufficiently fine porosity wherein air traversing the pores of the cylinder subject to pressure differential is introduced into the water in the form of minute air bubbles. Before or after receiving the air bubbles, the water is strongly alkalized by the introduction of sodium hydroxide (caustic soda), or caustic potash, soda ash, or any mixtures of same that can function as an alkalizing agent, to react with the acid flocculating material to produce floc. The alkalized aerated water is then mixed with the mixture of laundry waste, aluminum sulphate, bentonite, and other chemical reagents at a rate to maintain the pH of the effluent at approximately 7.0 to 7.3. This is the mixture fed into the clarifier.

The sodium hydroxide injected into the air bubble dispersion tends to coat the bubbles by forming a film at the air-water interface. A further advantage of having the air bubbles dispersed in alkalized water is that the stability of the minute air bubbles is greatly increased. In the mixture, the alum reacts with the hydroxyl ions in the film to form aluminum hydroxide floc. This floc is thereby firmly attached to the occluded air bubble, and as the influent enters the flocculation chamber in the clarifier, it is floated as floc and continues to grow around the bubble, further entrapping waste material and bacteria as it rises. The resulting foamy sludge is removed from the surface by skimmer blades, while the clarified liquid finds its way over a weir into a collecting circumferential cavity from which it is tapped off and stored for reuse. Occlusion of bacteria in the sludge leaves the water relatively sterile.

In the drawings:

FIG. 1 is a diagrammatic view of apparatus for the practice of the invention.

FIG. 2 is a plan view of the clarifier.

FIG. 3 is an enlarged fragmentary detail view taken in section on the line 3—3 of FIG. 1.

FIG. 4 is an enlarged detail view taken in section on the line 4—4 of FIG. 1.

Waste wash water discharged from the washer 5 enters the accumulator or ballast tank 6. Therein, bentonite is desirably added to the water at the rate of approximately 2.5 grains of bentonite per gallon. The precise amount of bentonite to be added will vary according to the amount of oils, waxes or greases present in the water, and it may vary also according to the nature of the greases or waxes. The waxes adsorbed on the surface and the oils absorbed into the bentonite particles, if these are porous, will be picked up in the floc which is formed later in the operation of the process. The bentonite is maintained in suspension in tank 7 by a motor-driven agitator 8 and fed to the accumulator tank 6 by a motor-driven metering pump 9 operated as required. The percentage of bentonite given is the preferred percentage, but is not critical and may be varied as desired.

When a sufficient amount of water has accumulated in the ballast tank 6, it is removed by a pump 10 and heated to approximately 140° F. in the heater 11, the purpose of heating being to raise the temperature of the water to a value which will be most effective for the chemical reactions to which it is to be subjected. The temperature of 140° F. is given by way of example and not by a way of limitation.

As the water passes through the venturi injector 12, it is strongly acidified by alum fed in solution from an elevated tank 13 under the control of a variably adjustable dual metering pump 14 driven by motor 15. The pump is operated in practice at a rate to feed the aluminum sulphate in the proportion of about 50 grains per gallon of water to be treated. The pH of the treated water can be tested at various points by withdrawing a sample through one of the valves 16.

It will be understood that other acidifying materials capable of producing a floc when alkalized may be substituted for the alum, and it is also possible to form the alkalizing agent in situ by using such inexpensive materials as aluminum oxide and sulfuric acid. In fact, even if alum is used as the flocculating agent, it is preferred to supplement it by sulfuric acid fed from the supply tank 3 into the water by the motor operated proportion pump 4. Typical acid flocculating materials which may be substituted for the alum are ferric or chromic sulphate; ferric or chromic chloride (in which case, if acid is also used, it should constitute hydrochloric acid); and aluminum oxide (either hydrochloric or sulfuric acid being usable therewith).

A flow meter 5 provides a convenient means of controlling the various proportioning pumps for the flocculating and alkalizing agents if the desired pH is known.

In laundry practice, the waste water normally has a pH of between 10.0 and 11.0. This high alkalinity is preferably reduced by means of the sulfuric acid to a pH of between 7.2 and 6.5. This reduces to a minimum the amount of aluminum sulphate that must be used as a flocculating agent. The excess alkalinity in the waste water is usually in the form of sodium hydroxide with which the sulfuric acid reacts to produce sodium sulphate and water. An advantage of the system and method herein disclosed consists in the progressive softening of the water. After it has passed through the treatment for several cycles, it will approach zero hardness. Sodium bicarbonate will have been reduced to sodium sulphate and carbon dioxide gas, and calcium bicarbonate or carbonate will have been reduced to calcium sulphate and carbon dioxide gas. While the calcium sulphate is not very soluble, the precepitate will be picked up in the floc formed as hereinafter described.

The strongly alkaline raw laundry waste water can be acidified by using aluminum sulphate which is $Al_2(SO_4)_3$. This is sometimes called papermakers alum, but strictly speaking, this is a misnomer inasmuch as ordinary alum is potassium aluminum sulphate. If the aluminum sulphate is added directly to the waste water without previous introduction of sulfuric acid, a great deal of aluminum sulphate is required and it is relatively high priced as compared with sulfuric acid. Moreover, it may produce a floc prematurely and in a form that cannot readily be controlled. If aluminum sulphate is added to water which has a high pH, the resulting basic aluminum sulphate coagulates as a relatively undesirable type of floc. At a pH below 7.0, the basic aluminum sulphate does not form. It is preferable to make the first part of the acidification with sulfuric acid. Completion of the acidification by the addition of aluminum sulphate in the preferred proportions will have the effect of further reducing the pH to the approximate range of 4.4 to 5.5.

True alum, i.e. potassium aluminum sulphate, may be used as a flocculating agent, but in this case also, the initial part of the acidification from the high pH of between 10 to 11 to about 7.2 is preferably made with sulfuric acid, after which the acidification can be completed with potassium aluminum sulphate (alum).

In the venturi aspirator 17, the acidified waste water is mixed with a recirculated fragment of clarified water which has been aerated and strongly alkalized in a manner hereinafter to be described. The mixture is fed through pipe 18 into the flocculation tank 19 of clarifier 20. Surrounding the flocculation tank is a tubular baffle 21 within which separation of impurities occurs. The relatively clear water passes around the bottom of the sleeve 21 into an annular space 22 from which it overflows the weir 23 provided by the top of the clarifier tank 20. The chamber 24 collects the clarified water and it is drawn off through the pipe 25.

From the annular space 22 a portion of the clarified water is withdrawn through the pipe 26 and aerated by contact with a porous wall through which air or equivalent gases such as nitrogen, oxygen or argon is forced under appropriate pressure differential to form minute bubbles. The aspirator 17 tends to create the requisite pressure differential, but compressed air may be supplied by pipe 32. In practice, it is preferred that this wall comprise a conduit in the form of a porous ceramic sleeve 30 through which the water component passes to receive the dispersed bubbles.

Either before or after aeration, this component of the water will be rendered alkaline by introduction of sodium hydroxide or other strongly basic material fed from the supply tank 33 through the dual proportioning pump 14 and pipe 34, and delivered into the water either prior to aeration or immediately thereafter. The alkali may be fed from pipe 34 into pipe 35 through valve 36 if desired, or may be fed through valve 37 into pipe 26, this being preferred. The valve 38 may be closed if it be desired to supply to supply make-up water through valve controlled pipe 39 for alkalizing and aeration in lieu of recirculated water.

When the gas bubble dispersion becomes mixed with the alkalized water at 35, the bubbles are coated with films forming on the gas water interface. When interaction with the acidified waste water ocurs in the injector 17, the alum reacts with the hydroxide floc around the air bubbles. To some extent, the bentonite acts to "seed" the water with inert particles to facilitate floc formation and to carry the grease, waxes, oils and dirt into the floc.

The caustic soda used is an inexpensive form of alkali which reacts with the aluminum sulphate to form an insoluble gelatinous floc comprising aluminum hydroxide. Care must be taken to prevent the introduction of too much alkali, since an excess of caustic soda will react with the aluminum hydroxide floc to produce a sodium aluminate which is soluble. The pH should not be permitted to exceed 7.2 ordinarily, and desirably should be kept between 6.8 and 7.0, with 7.3 being the usual top limit permissible.

The floc continues to form in the flocculation chamber 19, remaining firmly attached to the gas bubbles occluded therein so that the floc rises through the flocculation chamber, trapping in the floc all waste material in the water. The cross section of the flocculation chamber is large enough so that water flow therein is very slow. The floc with entrained bubbles, greases, dirt and bacteria rises to the surface of the water at the top of sleeve 21 where it forms a foamy sludge in which substantially all foreign matter capable of flotation is entrained.

At the point where the sludge accumulates, skimmer blades 40 are rotated by motor 41 whose armature shaft 42 is provided with arm 43 having depending fingers 44 on which the blades are vertically reciprocable. The blades are carried on outer and inner rollers 45 and 46 operating on outer and inner cam tracks 47 and 48 respectively. There is at least one radial discharge trough 50 with margins somewhat elevated above the normal water level as defined by the weir 23. As the rotating blades 40 sweep the foamy sludge from the surface of the water, they are successively elevated to clear the margins 51 of trough 50, the respective cam tracks 47, 48 having elevated ramps 53, 54 for this purpose.

Assuming that the waste laundry water does not include any great amount of oil or excessive soil, it can be clarified very effectively and reused indefinitely. In experimentation, the sludge formed at the average rate of 376 pounds per 1000 gallons of waste water. However, this sludge was largely composed of water, and it flows readily through the discharge pipe 55 to a sewer. The weight of sludge formed is a function of the amount of soil in the laundry waste.

Both the density and concentration of solids in the sludge depends quite specifically on the amount of air used to float the coagulated floc. A high rate of introduction of air results in a relatively dry sludge with high concentration of solids, while a low rate of air introduction results in a sludge of high water content. In practice, the sludge was found to average 98.4% water.

Various features of the method and device as herein disclosed are separately usable in other apparatus. The clarifier as such is one such feature, and the aerating device with its pressure chamber and porous conduit is another such feature.

While various particulars as to temperature and amounts of ingredients have been supplied by way of example, it is not desired to limit the invention to those particular proportions or ingredients, except as specified in the accompanying claims. It is intended that chemical equivalents may be substituted for the alum and the sodium hydroxide suggested as the preferred chemicals used in the practice of the invention.

The chemical reactions involved in the foregoing process are such as to produce sodium sulphate as a by-product. This sulphate tends to remain soluble unless the concentration becomes very high. However, in a laundry operation, and in most other operations, make-up water is constantly being added. Specifically, in a laundry, the clarified water is usually employed as the hot water in the laundry operation, and the cold water which is added in the washer may amount to about 15 percent or more of the total, and an equivalent amount must constantly be discarded. If 15 percent of water is discarded with each cycle and an equivalent of fresh water is added, then the concentration of sodium sulphate in the recycled water can never exceed $6.67\times$ the amount of sodium sulphate originally present in the raw water. With a normal water supply, this would limit the maximum concentration of sodium sulphate to 2 percent or 3 percent, a figure which is too low to occasion any trouble.

There may also be gradual accumulations of sodium chloride, but sodium chloride is soluble and has wider range of temperatures than sodium sulphate and will accumulate more slowly and will almost certainly be kept at a minimum value by normal additions of make-up water.

I claim:

1. A method of clarification of waste laundry water containing mechanically separable coagulable waste, which method comprises the steps of acidification of the waste water with a flocculating agent, admixture therewith of alkalized aerated water to produce a floating floc containing the waste, and separating the floc from the water.

2. The method recited in claim 1 in which the alkalized aerated water includes some water returned from the separating step aforesaid.

3. The method recited in claim 1 in which the waste includes greasy material and the water containing such waste has bentonite added to it in suspension and by which such material is collected.

4. The method recited in claim 1 in which the water containing waste has aluminum sulphate added to it for its acidification, and the aerated water has sodium hydroxide added to it for its alkalization, the resulting floc forming about the air bubbles dispersed in the alkalized component.

5. A method of clarifying water containing laundry waste, which method consists in the addition to such water of a small amount of bentonite in suspension, the heating of such water, the progressive acidification of such water by first adding sulphuric acid and subsequently by the addition to such water of aluminum sulphate at the approximate rate of 50 grains per gallon, the mixture with the acidified waste-containing water of other water containing dispersed air bubbles, and sufficient sodium hydroxide to bring the total pH to a value of approximately 7.0, holding the resulting mixture at a low rate of flow until a floc rises thereon in which air bubbles and impurities are trapped, and skimming the resulting flocculant sludge from the surface, and discharging the clarified water.

References Cited in the file of this patent

UNITED STATES PATENTS

| | | |
|---|---|---|
| 2,613,180 | Green et al. | Oct. 7, 1952 |
| 2,695,710 | Gibbs | Nov. 30, 1954 |
| 2,762,681 | Crowley | Sept. 11, 1956 |

FOREIGN PATENTS

| | | |
|---|---|---|
| 694,918 | Great Britain | July 29, 1953 |

OTHER REFERENCES

Holmes: Bulletin No. 14–A, issued by Service Department, National Aliminate Corporation, Chicago, 1928, 4 pages.